(No Model.) 2 Sheets—Sheet 1.

R. L. HUDSON.
COMBINED PLANTER AND FERTILIZER DISTRIBUTER.

No. 601,017. Patented Mar. 22, 1898.

Witnesses
Harry W. Hahn
Victor J. Evans

Inventor
Robert L. Hudson.
By John Wedderburn
Attorney (No Model.) 2 Sheets—Sheet 2.

R. L. HUDSON.
COMBINED PLANTER AND FERTILIZER DISTRIBUTER.

No. 601,017. Patented Mar. 22, 1898.

Witnesses
Harry W. Hahn
Victor J. Evans

Inventor
Robert L. Hudson
By John Wedderburn
Attorney

UNITED STATES PATENT OFFICE.

ROBERT L. HUDSON, OF BARFIELD, ALABAMA.

COMBINED PLANTER AND FERTILIZER-DISTRIBUTER.

SPECIFICATION forming part of Letters Patent No. 601,017, dated March 22, 1898.

Application filed August 24, 1897. Serial No. 649,326. (No model.)

*To all whom it may concern:*

Be it known that I, ROBERT L. HUDSON, a citizen of the United States of America, residing at Barfield, in the county of Clay and State of Alabama, have invented certain new and useful Improvements in a Combined Planter and Distributer; and I do hereby declare the following to be a full, clear, and exact description of the invention, such as will enable others skilled in the art to which it appertains to make and use the same.

My present invention relates to combined planters and distributers, and has for its object to produce an agricultural implement of this particular character by means of which cotton or other seed may be properly sown and guano or other fertilizer may be simultaneously distributed within the furrow.

A further object of my invention, subordinate to the foregoing, is the accomplishment of a relative adjustment of the planting and distributing mechanisms which will permit the seed and fertilizer to be deposited together or one below the other in a manner and for a purpose hereinafter to be made apparent.

To the accomplishment of these general objects and others subordinate thereto my invention consists in providing a plow of any suitable construction with a hopper for the reception of the seed and a second hopper designed for the reception of the fertilizer, spouts designed to direct the egress from said hoppers, and a grinding device located intermediate of the fertilizer-hopper and its spout and designed to be actuated by a traction-wheel carried upon the plow-beam for the purpose of grinding the fertilizer prior to its distribution.

The invention consists, further, in peculiarities of construction and arrangement of parts, which will presently be made apparent.

Figure 1:
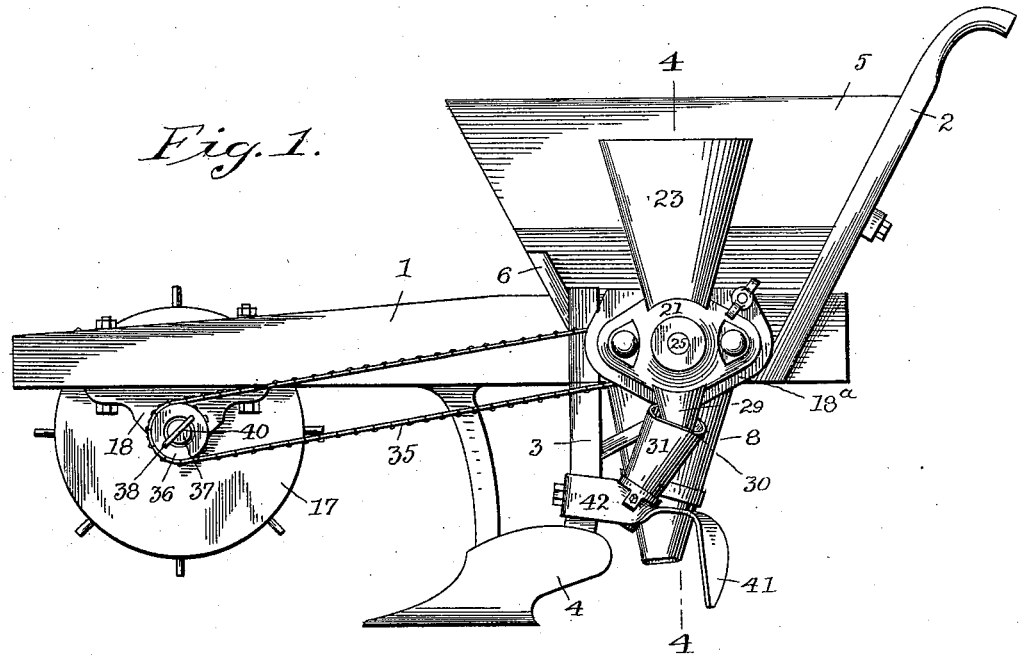
Figure 2:
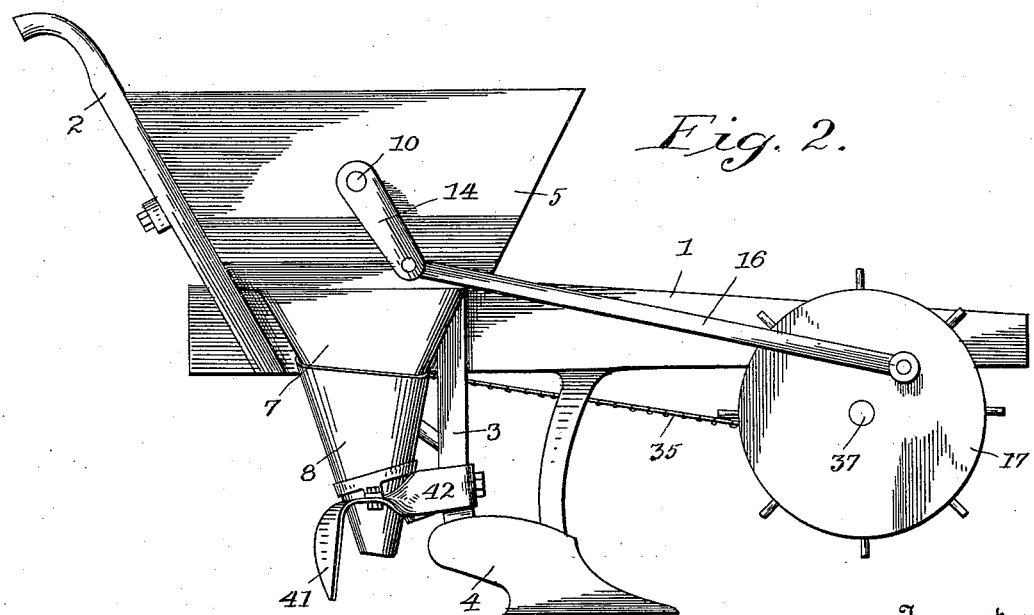
Figure 3:
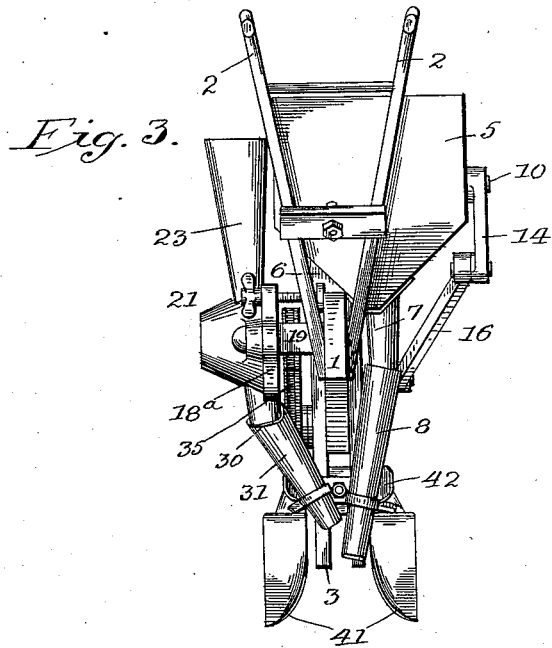
Figure 4:
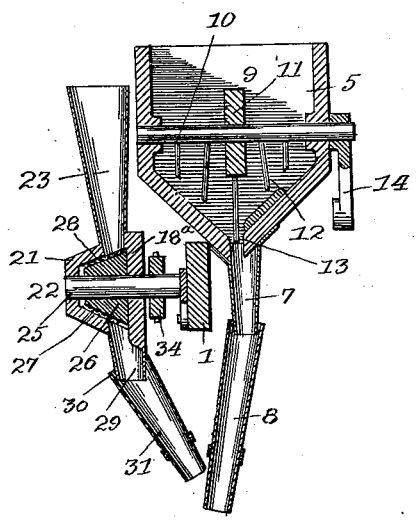

Referring to the drawings, Figure 1 is a side elevation of my device complete. Fig. 2 is a similar view looking from the opposite side. Fig. 3 is a rear elevation. Fig. 4 is a central vertical section on the line 4 4 of Fig. 1.

Referring to the numerals on the drawings, 1 indicates a plow-beam of any suitable construction provided with upwardly-diverging handles 2 at its rear extremity and with a substantially vertical stock 3, bolted or otherwise secured thereto in front of the handles and carrying at its lower extremity a plowshare 4.

5 indicates a seed-hopper suitably mounted to one side of the beam and above the same upon brackets 6 and designed to discharge the seed to be planted through the hopper-nozzle 7, depending from the bottom of the hopper 5 and to the lower extremity of which is adjustably connected a seed-spout 8, designed to direct the seed from the hopper to the furrow.

9 indicates an agitator within the hopper 5, consisting of a shaft 10, provided medially with a disk 11, from which radiates a series of pins 12, designed to extend downwardly through the converging bottom 13 of the hopper to prevent the clogging of the entrance to the nozzle. Any suitable means may be employed for actuating the agitator, but I prefer to employ a crank 14, mounted upon the outer extremity of the agitator-shaft and pivotally connected to one extremity of a pitman 16, eccentrically pivoted at its opposite extremity to a traction-wheel 17, mounted in suitable bearings 18, located upon the under side of the forward end of the beam 1 and having spikes in its periphery designed to take into the ground.

It will be observed that as the device is drawn over the ground the rotation of the wheel 17 will cause the operation of the agitator and will in this manner insure the regular feeding of the cotton or other seed carried within the hopper 5.

18ª indicates a suitable bracket carried by supporting-arms 19 upon the side of the beam 1 opposite the hopper 5, and to which is secured the casing 21 of a fertilizer-grinding mill 22, designed to support a fertilizer-hopper 23, extending above the casing. The grinding-mill consists, essentially, of a shaft 25, extending transversely through the casing and provided within the latter with a grinding-disk 26, provided with teeth 27, designed to coöperate with internal teeth 28 upon the interior of the casing to grind the guano or other fertilizer as it gravitates from the fertilizer-hopper.

29 indicates a fertilizer-nozzle depending from the bottom of the grinding-mill casing and opening into the upper flared extremity 30 of a fertilizer-spout 31, supported in such manner as to permit its elevation or depression for the purpose of causing the fertilizer to be distributed a sufficient distance below the extremity of the seed-nozzle when it is desired for any reason to have the fertilizer slightly separated from the seeds, which condition would perhaps be desirable where the ground is very moist and where the distribution of the fertilizer and seed together would cause heating likely to prevent the rapid development or germination necessary to the sprouting of the plant.

Any suitable means for actuating the grinding-mill may be employed, but I prefer to use a sprocket-wheel 34 upon the inner extremity of the shaft 25 and to gear said sprocket-wheel through a sprocket-chain 35 with a sprocket-wheel 36, carried upon the extremity of the shaft 37 of the traction-wheel, suitable means being preferably provided for throwing the last-named shaft out of gear with the sprocket-wheel carried thereby for the purpose of preventing the operation of the fertilizer-distributing apparatus when it is desired to sow the seed without the fertilizer. This mechanism preferably consists of a spring 38, carried by the sprocket-wheel, and designed, when the device is thrown in gear, to engage a transverse groove 40 in the extremity of the shaft 37. Any suitable means may be employed for regulating the feed of seed and fertilizer from the hoppers to the spouts, that illustrated being perhaps a preferable embodiment of such features of the device.

41 indicates a pair of covering-plates formed by shaping and bending the extremities of a metal band 42 and securing the latter at a medial point to the front of the plow-stock by any suitable securing means which will permit of the vertical adjustment of the strap with respect to the stock for the purpose of regulating the depth of said covering-plates and the consequent amount of earth to be thrown over the seeds during the process of sowing. The spouts 8 and 31 being supported by the band or part 42 are movable therewith. Hence the spouts and covering-plates maintain a given relation during the vertical adjustments of the part 42.

It will be observed that by the employment of my combined planter and fertilizer-distributer I am enabled to plant seed and distribute the fertilizer either simultaneously or separately and am enabled to cause the seed and fertilizer to be distributed either together or at varying depths, as the condition of the ground may demand.

While the construction illustrated and described appears to constitute a preferable embodiment of my invention, I do not desire to limit myself to such structural details, but reserve to myself the right to change, modify, or vary them at will within the scope of my invention.

Having thus described my invention, what I claim as new, and desire to secure by Letters Patent, is—

1. In a planter, the combination of a pair of spouts, a stock, and covering-plates having adjustable connection with the stock and supporting and carrying the said spouts, substantially as specified.

2. In a combined planter and distributer, the combination with a plow beam and stock, of a seed-hopper and agitator therein and an adjustable spout extending therebelow upon one side of the beam, a grinding-mill casing carried upon the opposite side of the beam and having internal teeth, a transverse shaft extending through said casing and provided with a toothed disk in operative relation with the teeth upon the casing, a sprocket-wheel carried upon the inner extremity of the shaft adjacent to the beam, a traction-wheel journaled in suitable bearings upon the plow-beam adjacent to its forward extremity, a sprocket-wheel carried by the shaft of said traction-wheel, means for throwing said sprocket-wheel into or out of operative relation with the shaft, a sprocket-chain operatively connecting said sprocket-wheel with the sprocket-wheel carried by the grinding-shaft, a fertilizer-hopper extending above the casing of the grinding-mill, an adjustable spout extending below said casing, and a pair of covering-plates adjustably carried by the plow-stock contiguous to the lower ends of the adjustable spouts and extending behind the same, substantially as and for the purpose specified.

In testimony whereof I have signed this specification in the presence of two subscribing witnesses.

ROBERT L. HUDSON.

Witnesses:
F. G. McCAIN,
J. W. PHILLIPS.